March 12, 1963  G. GERARD ET AL  3,080,609
MULTI-ANVIL APPARATUS AND TEST BODIES THEREFOR
Filed July 27, 1960  6 Sheets-Sheet 1
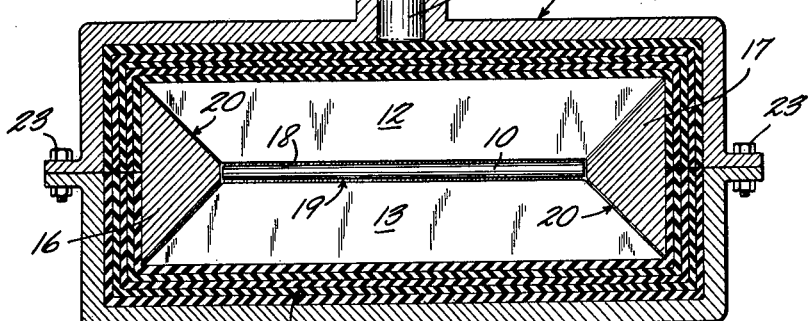
FIG. 1.
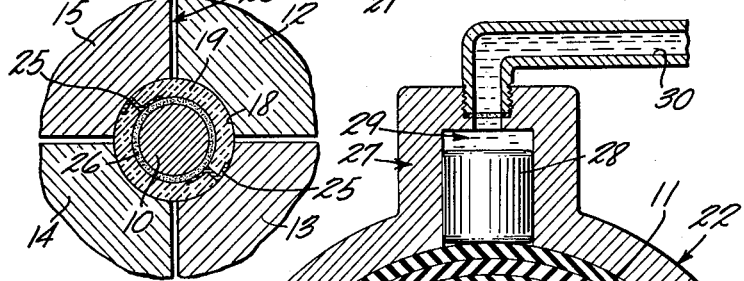
FIG. 3.  FIG. 2.
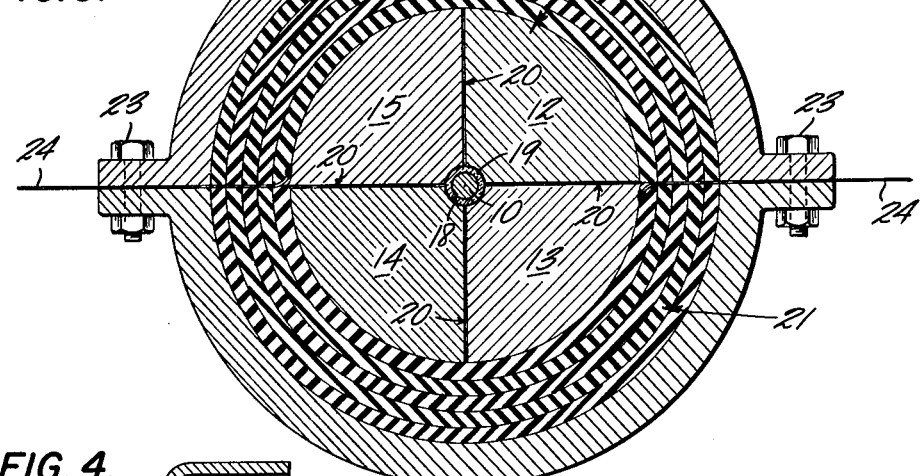
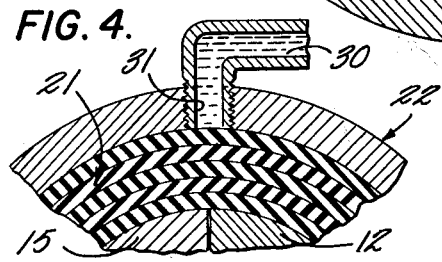
FIG. 4.
INVENTORS.
GEORGE GERARD &
BY JACOB BRAYMAN
Brumbaugh, Free,
Graves + Donohue
their ATTORNEYS.

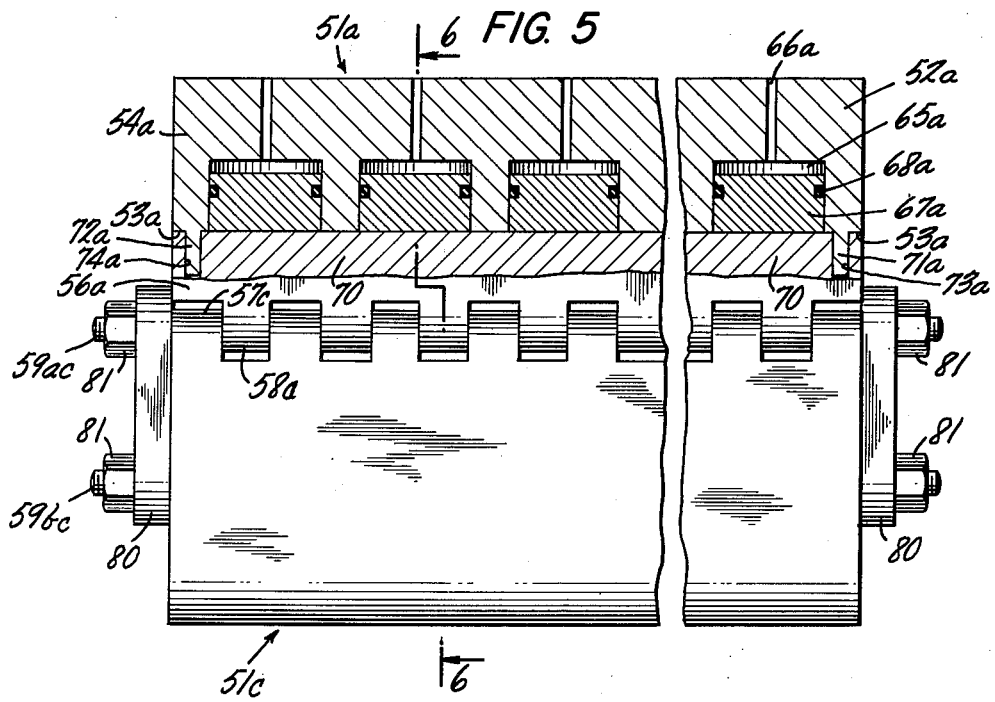
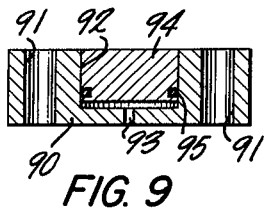
FIG. 9
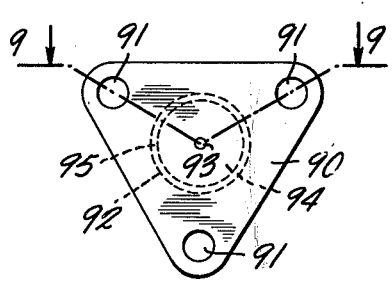
FIG. 8
INVENTORS.
GEORGE GERARD &
JACOB BRAYMAN
their ATTORNEYS INVENTORS.
GEORGE GERARD &
JACOB BRAYMAN
BY Brumbaugh, Free,
Graves + Donohue
their ATTORNEYS March 12, 1963 G. GERARD ET AL 3,080,609
MULTI-ANVIL APPARATUS AND TEST BODIES THEREFOR
Filed July 27, 1960 6 Sheets-Sheet 5

INVENTORS.
GEORGE GERARD &
JACOB BRAYMAN
BY Brumbaugh, Free,
Graves + Donahue
their ATTORNEYS March 12, 1963 G. GERARD ET AL 3,080,609
MULTI-ANVIL APPARATUS AND TEST BODIES THEREFOR
Filed July 27, 1960 6 Sheets-Sheet 6

INVENTORS.
GEORGE GERARD &
JACOB BRAYMAN
BY
their ATTORNEYS

United States Patent Office 3,080,609
Patented Mar. 12, 1963

3,080,609
MULTI-ANVIL APPARATUS AND TEST BODIES THEREFOR
George Gerard, Yonkers, and Jacob Brayman, Staten Island, N.Y., assignors to Barogenics, Inc., a corporation of New York
Filed July 27, 1960, Ser. No. 45,608
16 Claims. (Cl. 18—16)

This invention relates to super-high pressure apparatus and, more particularly, to a new and improved apparatus of this sort. This application is a continuation in part of our co-pending U.S. patent application Serial No. 785,690 filed January 8, 1959.

Generally, the structural requirements of many newly developed forms of apparatus, such as jet and rocket engine systems, often exceed the physical characteristics such as fatigue life, yield strength, and modulus of rigidity of the materials now available. Little improvement of these characteristics is to be expected by further refinements in the materials or in heat treating procedures. On the other hand, the application of extreme pressures to such materials now appears to be an effective way of improving their physical characteristics as by inducing phase changes and promoting the alloying of materials that cannot be alloyed at normal pressures.

Heretofore, however, apparatus for subjecting objects to extremely high pressures has been limited as to the size and shape of the objects and has required massive support structures.

Accordingly, it is an object of this invention to provide new and improved high pressure apparatus capable of applying pressures in the range of 20,000 to 200,000 atmospheres and in excess of 200,000 atmospheres.

Another object of the invention is to provide apparatus of the above character capable of applying extreme pressures to test bodies of cylindric or prismatic shape and to provide such test bodies of such shape.

A further object of the invention is to provide apparatus of the above character having relatively simple and inexpensive structures.

These and other objects of the invention are attained by encasing a specimen to be subjected to extreme pressure in a pressure-transmitting material (which together, with the specimen forms a test body of cylindric or prismatic shape), and by enclosing the test body in a pressure-multiplying device comprising a plurality of pressure multiplying elements (i.e. anvils) converging toward the object. The pressure-multiplying device may be surrounded by a resilient pressure-transmitting medium in contact with the larger ends of all the elements, while a housing capable of withstanding conventional high pressures may enclose the resilient medium, and may include means for applying high pressure to the resilient medium. Alternatively, the pressure multiplying device may be provided by a plurality of anvils which are actuated by means other than a resilient pressure transmitting medium to undergo simultaneous relative movement towards a central point of the test body to thereby compress the test body.

Further objects and advantages of the invention will be apparent from a reading of the following description in conjunction with the accompanying drawings in which:

FIG. 1 is a view in longitudinal section through a representative form of super-high pressure apparatus arranged according to the invention;

FIG. 2 is a cross-sectional view of the apparatus of FIG. 1 taken on the lines 2—2 and looking in the direction of the arrows;

FIG. 3 is a magnified sectional fragmentary view showing the central portion of the apparatus of FIG. 2;

FIG. 4 is a fragmentary view showing a modified form of the apparatus of FIG. 1.

FIG. 5 is a side elevation of a single "delta" form of super-high pressure apparatus, part of such apparatus being seen in cross-section as indicated by the arrows 5—5 in FIG. 6;

FIG. 6 is a view in the direction indicated by the arrows 6—6 of FIG. 5 of a vertical cross section through the FIG. 5 apparatus;

FIG. 7 is a view in the direction indicated by arrows 7—7 in FIG. 6 of a cross section taken through the FIG. 5 apparatus in the manner shown by the cross-sectioning line in FIG. 6;

FIG. 8 is an end elevation of a modified form of end closure for the FIG. 5 apparatus;

Figure 9:
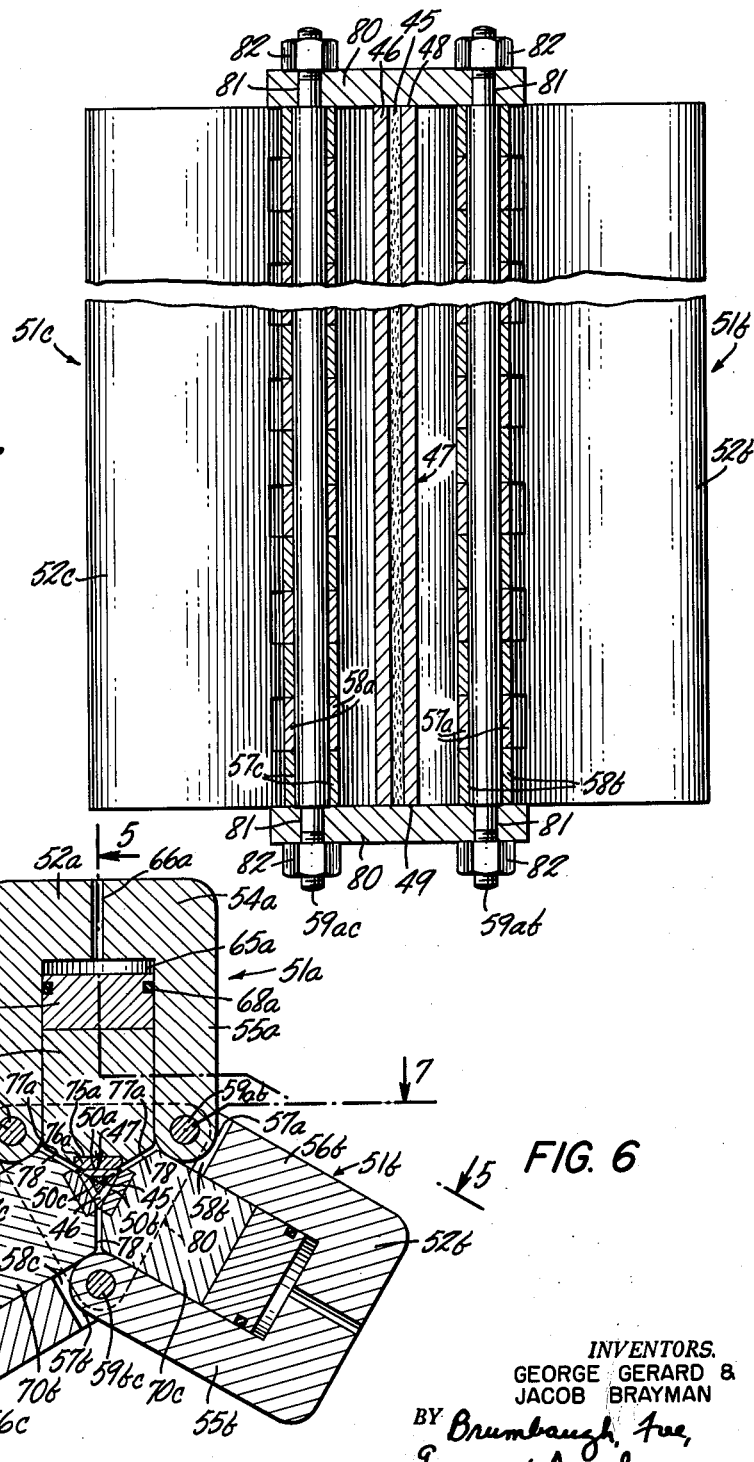
FIG. 9 is a view, taken as indicated by the arrows 9—9 in FIG. 8 of a cross section of the end closure of FIG. 8.

In the FIG. 1 embodiment of the invention, the high pressure apparatus is arranged to subject a longitudinal work piece, such as a shaft 10, to pressures up to 200,000 atmospheres or more. It will be understood, however, that the object to which extreme pressures are applied may be of any desired shape and that there is no limitation on the size of the object since the apparatus may be arranged with any appropriate configuration and capacity.

In order to exert super-high pressures, the apparatus of FIGS. 1 and 2 includes a cylindrical pressure-multiplying member 11 comprising six wedge-shaped segments 12–17 having inner surfaces forming a cavity 18 conforming generally to the outer shape of the shaft 10, the end segments 16 and 17 being conical in form. These segments are made of any suitable material such as cemented tungsten carbide, for example, which is capable of withstanding the extreme pressures under consideration without substantial deformation or disintegration. It will be understood that any number of pressure-multiplying segments can be used in apparatus according to the invention, and that their shape may vary according to the configuration of the work piece 10 and the member 11. For example, if the work piece is of compact shape, the member 11 may be a sphere, cube or tetrahedron and may be divided into four, six or eight identical wedge-shaped segments. Furthermore, the shape of the cavity 18 need not conform to the contour of the work piece 10, since the cavity is filled with a pressure-transmitting medium as described below. Thus, for objects of complex shape, such as turbine blades, for example, the cavity may have the nearest simple geometrical shape capable of enclosing the object.

Within the cavity 18, the shaft 10 is encased in a pressure-transmitting shell 19 composed of any material which is semi-plastic or highly viscous but substantially maintains its shape at the extreme pressures to be generated. Preferably, because of its ease of machining and its electrical and heat insulation properties, the material utilized in the invention is a pyrophyllite, such as Tennessee Grade A lava. Each of the segments 12–17 has its inner face in contact with the shell 19 and the dimensions of all the segments are chosen so that, with their inner faces in contact with the shell, there is a narrow gap 20 between each adjacent pair of segments.

Inasmuch as the degree of pressure-multiplication achieved by the wedge-shaped segments 12–17 is dependent on the relative areas of their outer and inner surfaces, the outer diameter and length of the member 11 are selected relative to the diameter and length of the cavity 18 in accordance with the desired super-high pressure to be obtained in the cavity and the pressure to be applied to the apparatus at the outside of the member 11. Thus, for example, if a pressure-multiplication of 100 is desired and the cavity is approximately 1 inch in diameter, the member 11 need only be approximately 10 inches in diameter. This relation holds for cavities of uniform cross-section regardless of the length of the cavity. For irregularly shaped cavities, however, the relative areas of each segment to be selected so that all the segments have the same pressure-multiplication factor. Again in this case, a narrow gap 20 must be included between the adjacent faces of the segments.

Surrounding the pressure-multiplying member 11 is a layer 21 of pressure-transmitting material, the entire assembly being enclosed in a close fitting metal housing 22 of high strength. The layer 21 and the housing 22 may each be made in two parts which are separably joined as by bolts 23 or other suitable means to provide easy access to the member 11.

In order to heat the work piece 10 while applying pressure, two electrical conductors 24 are carried in through the housing 22 and the layer 21 and are joined to opposite segments 13 and 15 of the member 11. Also, as shown in FIG. 3, two conductive electrodes 25 are mounted in the shell 19 to carry current to the interior of the shell and are oriented to contact the segments 13 and 15, respectively. A resistive graphite layer 26 surrounds the shaft 10 within the shell and has its outer surface in contact with the two electrodes 25 at diametrically opposite positions and at opposite ends of the layer 26 to generate heat when power is applied to the conductors 24. When the work piece is to be heated in this manner, the viscous pressure-transmitting material should provide good electrical and heat insulation and the lava referred to above serves this purpose well. In addition, thermocouple leads (not shown) may also be connected through the shell 19 and through two other segments 12 and 14 in a similar manner to measure the temperature of the work piece.

In order to apply pressure to the layer 21, the housing 22 includes a cylinder 27 communicating with the interior of the housing and a piston 28 is slidably mounted therein. At its outer end, the cylinder 27 has a cavity 29 to receive hydraulic fluid which is joined to a conventional hydraulic system (not shown) providing pressures of 2,000 atmospheres and up, for example, in any well-known manner through a conduit 30. The pressure-transmitting medium 21, which is preferably formed of successive layers of rubber as in conventional rubber pad presses, should be firm enough to prevent extrusion into the gap 20 under pressure, but also sufficiently resilient to provide equal pressure over the entire outer surface of the member 11 in response to operation of the piston 28. For this purpose, the inner layers of rubber adjacent the member 11 may be substantially firm and the outer layers more flexible.

In operation, conventional high pressure is applied to this embodiment of the invention through the conduit 30 and the piston 28. This pressure should be a fraction of the desired super-high pressure commensurate with the multiplying factor of the member 11. Thus, to apply pressures in the range of 30,000 atmospheres to the shaft 10 with a pressure multiplication of 100 as described above, the the pressure applied to the piston 28 should be about 3,000 atmospheres. As the piston 28 is driven into the rubber layer 21, the pressure of the fluid in the cavity 29 is applied to the entire outer surface of the member 11 because of the pressure equalization throughout the pressure-transmitting medium 21. The resulting force on the outer surface of the member is transmitted through the segments 12–17 to the match smaller inner surface at the cavity 18, generating the desired super-high pressure at the outer surface of the shell 19.

Inasmuch as the pyrophyllite material of the shell 19 becomes semi-plastic or highly viscous at pressures above about 50,000 atmospheres, the material constitutes a pressure-transmitting medium at these pressures and applies the extreme pressure from the inner surfaces of the segments to the entire outer surface of the work piece 10. Also, the semi-plastic material acts as a seal by filling in the gaps 20 between the segments in the vicinity of the shell 19. If the work piece is to be heated during compression, electrical current is passed through the conductors 24, the segments 13 and 15, and the electrodes 25 to heat the graphite layer 19.

In the embodiment of the invention shown in FIG. 4, the pressure of the hydraulic system is applied through the conduit 30 and an aperture 31 into the housing 22 directly to the outside of the pressure-transmitting layer 21. In this instance, the pressure-transmitting medium should provide a fluid-tight enclosure about the member 11 to prevent any hydraulic fluid from passing into the gaps 20. Inasmuch as the FIG. 4 embodiment has no piston stroke limitation and any necessary quantity of fluid may be forced into the housing, it is not necessary to provide a close fit between the rubber layer 21 and the housing 22.

In the described apparatus, the specimen 10 to be compressed, the surrounding graphite layer 26, and the enclosing shell 19 of pressure transmitting material are elements of a test body which also includes the electrodes 25 and any other leads, sample tubes or other elements embedded in shell 19. Such test body is of an elongated shape which may be described in geometric terms as that of a three-dimensional body having two end surfaces connected by a peripheral surface, the latter being generatable by self-parallel movement of a straight line in a closed path. As so described, the shape of the mentioned test body is the common shape of both cylindrical bodies (wherein the closed path is curved) and of prismatic bodies (wherein the closed path is the circumference of a polygon). Thus the described shape will be referred to herein as a "cylindric-prismatic" shape.

An elongated test body of cylindric-prismatic shape is preferable to a non-elongated body of such shape or to a regular polyhedral test body for a reason which will now be explained. Given a test body of the described cylindric-prismatic shape but which is non-elongated so that its length $s$ in the direction of the dimension of its principal axis is, say, equal to the maximum cross-sectional dimension $w$ of the body ($w$ being the diameter where the body is cylindric), and, given the problem of increasing the size of the test body so as to permit compression of a greater volume of specimen material, one apparent solution is to increase the cross-sectional dimensions of the test body itself and, correspondingly, the cross-sectional dimenions of the specimen mass and the apparatus outside the test body. Thus, for example, the cross-sectional dimensions of the test body, the specimen material therein and the anvils acting thereon might, say, be doubled to increase by a factor of four the volume of specimen material.

If the specimen of volume has so been increased fourfold, it follows that, in order to attain the same compression as before for a unit volume of specimen material, the total work done by the anvils must likewise be increased. Of this increase in work to be done, some is provided by the doubling of the cross-sectional dimensions of the anvils (to double the area of both the front face and the rear face of each anvil), whereby each anvil exerts on the test body an inward force which is twice as great as before when the same pressure as before is applied to the rear of the anvil. In this connection, it is assumed that such pressure is of a value selected (for the given pressure multiplication factor provided by the anvil) to produce maximum safe stress per unit area at the front of the anvil where the stress is greatest, and that, therefore, such pressure cannot be increased.

Thus, the doubling of the cross-sectional dimension of the anvil (and of the front and rear face areas thereof) accounts for some of the required increase in anvil work. The rest of the increase in such work evidently has to be provided by increasing the stroke of the anvil by some factor. In order, however, to increase the anvil stroke, it is necessary to increase by an equivalent factor the size of the gaps between the anvil. Any increase in gap size leads, however, to the problem that, as the gaps are made larger, the pyrophyllite extruded thereinto becomes less and less effective as a gasket for the pressurized pyrophyllite remaining within the central space. In fact, a point is finally reached where the extruded pyrophyllite will not act as a gasket at all, whereby all of the pressure transmitting material of the test body blows out through the gaps, and the apparatus becomes inoperable.

Apart from the gap size problem, as the cross-sectional dimensions of the apparatus are increased, the anvils, housing means and other apparatus parts tend to become massive and bulky to the point where they are cumbersome, hard to handle, tedious to align, and difficult to machine to the accurate tolerances which are required. Hence there are definite limitations to the degree to which the volume of specimen material can be increased by a general increase in cross-sectional dimensions. Moreover, such limitations are present when it is sought to increase all three dimensions of a regular polyhedral test body as well as when it is sought to increase the cross-sectional dimensions of a cylindric-prismatic test body.

As opposed to increasing the volume of specimen material by increasing the cross-sectional dimensions of its mass, such increase can be effected in cylindric-prismatic bodies by elongating the test body in its axial dimension. One advantage of such elongation is that inasmuch as the size of the inter-anvil gaps need not be increased, there is no accompanying necessary increase in the probability of a blowout through the gap of the pyrophyllite or other pressure transmitting material. Another advantage of increasing the specimen volume is that, as later described, it permits apparatus elements of standard commercial size to be used in tandem to thereby avoid increasing the size of individual ones of such elements.

A still further advantage of elongating the test body is the improvement thereby obtained in the electrical heating of the specimen by current passed through the test body. The reason for such improvement is explained in detail in U.S. patent application S.N. 45,571 filed of even date herewith and owned by the assignee of this application and now Patent 3,011,043. Briefly, however, it is that, for a given volume of material in a current path of uniform cross-section, and for a given input current (whose maximum value is limited, by, say, the current carrying capacity of the feeder leads such as the leads 25 in FIG. 3), the rate at which energy is converted from electricity to heat will vary as the square of the length of the current path as such length is increased at the expense of the cross-sectional area of the path. Therefore, from the point of view of obtaining improved heating effect, it is desirable to elongate the test body to the maximum extent which other considerations will permit.

Referring now to FIGS. 5-7, there is shown therein a single "delta" form of apparatus adapted, like the FIG. 1 apparatus, to realize the above described advantages of elongated test bodies. In such apparatus, the mass 45 of particulate specimen material is compacted into the form of an elongated prism of equilateral triangular cross-section. Surrounding this specimen mass except at its ends is a jacket 46 of pressure transmitting material (e.g. pyrophyllite or AgCl) for which the exterior outline of any cross-section is an equilateral triangle concentric with and having sides parallel to the triangle defined by the transected area at the center of the cross-section of the specimen mass 45. The specimen mass 45 and the jacket 46 together form a test body 47 which may further include a layer (not shown) of electro-conductive material ensheathing the specimen mass (as in the FIGURE 1 apparatus) to permit electrical heating thereof, and, also auxiliary elements such as current feeder leads, sample tubes and the like. As is evident, the shape of the test body 47 is that of an elongated prismatic bar having opposite equilateral triangular end faces 48, 49 (FIG. 7) and three identical side faces 50a, 50b, 50c (FIG. 6) of which each is in the form of an elongated rectangle whose plane is normal to the planes of the end faces 48, 49.

The three long sides 50a–50c of test body 47 are adapted to be simultaneously compressed by, respectively, the press assemblies 51a, 51b and 51c. Since those three assemblies are substantially identical, only the assembly 51 will be described in detail. It is to be understood, however, that, unless the context otherwise requires, any description of an element of assembly 51a is to be taken also as a description of the elements of assemblies 51b, 51c which are indicated as being counterparts of the first named element by virtue of being designated by the same reference numeral although by a different letter suffix for that numeral.

The press assembly 51a includes as one of its principal components a reaction housing 52a through the lower part of which there runs from end to end a deep, downwardly open channel 53a (FIG. 5) of rectangular cross-section (FIG. 6). Channel 53a is bounded on its upper side by a vertically thick portion of housing 52a forming a block 54a (FIG. 5). At its sides, the channel 53a is bounded by oppositely disposed portions of housing 52a forming flanges 55a, 56a, extending downwardly from the block 54a. Those two flanges 55a, 56a, terminate at their downward end in respective sets of clevises 57a, 58a. When the described single delta apparatus is assembled, the clevises 57a of assembly 51a are intermeshed with a matching set of clevises 58b of assembly 51b and the two assemblies are secured together by a hinged joint formed by driving a hinge pin 59ab into the bore running through the center of the meshed clevises 57a, 58b. Similarly, the assemblies 51a, 51c, are secured together by a hinge joint formed by a hinge pin 59ac parallel to pin 59ab and extending through the meshed clevises 58a, 57c, the assemblies 51b, 51c, being secured together in like manner by a hinge pin 59bc parallel to pins 59ab, 59ac and extending through meshed clevises 57b, 58c. By so connecting the assemblies 51a—51c together through hinged joints, the transmission of moments from one assembly to another is avoided. Further, and as explained in detail in copending application 804,546 filed April 6, 1959, by ourselves and A. Zeitlin (and owned by the assignee of this application), the hinge pin connections are advantageous in that they render the anvils self trueing in alignment, and in that the hinge pins provide high strength connections by virtue of reacting in multiple shear to applied forces. A similar hinged frame is described in our copending application Serial No. 833,809 filed August 13, 1959.

Returning to a consideration of assembly 51a, distributed along the length of the reaction housing 52a are a plurality of hydraulic cylinders 65a connected through ports 66a to fluid inlets at the top of the housing. Those cylinders may be formed directly in the block 54a of the housing to be integral therewith (as shown), or, alternatively, they may be standard hydraulic cylinder assemblies inserted into suitable receptacles formed in the block. Each of the cylinders 65a has received therein a hydraulic piston 67a carrying an O type packing ring 68a. While the ram units 65a—68a are shown herein schematically, it will be understood that, in practice, such units may include additional components (not shown) which are ordinarily employed therein, e.g. guides, bushings and other fittings. If desired, conventional "stacked" piston arrangements may be used.

The pistons 67a have forward planar driving faces which bear in lengthwise distributed areas against the rear face of an anvil 70a, the latter being in the form of an elongated rectangular bar extending within channel 53a from end to end of the housing 52a. For clearance purposes, the longitudinally opposite ends of the anvil may be disposed slightly inwards of the longitudinally opposite ends of the housing.

The anvil 70a is slidable within the channel to permit a downward displacement of the anvil by the pistons 67a. To assure that such downward displacement is accurately directed, the anvil is guided in its stroke by a pair of dowel pins 71a, 72a (FIG. 5) projecting downward from the block 54a to be received with a close fit in vertical bores 73a, 74a formed in the anvil. Those same dowel pins constrain the anvil from either longitudinal or rotary motion during actuation thereof.

As shown by FIG. 6, the front end of anvil 70a has formed therein a shallow, longitudinal, downwardly open channel 75a which is of rectangular cross-section. Within this channel there is received with a shrink or press fit an elongated rectangular insert 76a of a high compression strength material such as high speed tool steel or carboloy. Such insert provides at the front end of anvil 70a an elongated, rectangular, planar front face whose edges are parallel to the edges of the side face 50a of test body 47, and which is adapted to press with a flat contact against that face of the test body. The width of this anvil front face is slightly less than the width of the confronting face 50a of the test body 47, and it is considerably less than the diameter of the areas at the rear face of anvil 70a contacted by the pistons 67a. The same front face (of insert 76a) is vertically flush with the downward terminations of the side walls of channel 75a. The anvil is chamfered on either side of the insert to have sloping faces 77a which extend to the forward edges of the insert 76a to produce a forwardly diminishing taper of the front end of the anvil. As in the case of the FIG. 1 apparatus, the sloping faces of all the anvils are separated from each other by narrow gaps, 78.

In the single delta apparatus there are certain geometric relations as follows. The center lines of action of the pistons 67a lie in a vertical center plane about which the entire press assembly 51a is axially symmetrical. Such plane is normal to the rear face of anvil 70a and to the front face of that anvil (provided by insert 76a), it passes normally through elongated side face 50a of test body 47 to intersect the longitudinal center axis thereof, and it contains the longitudinal axis of housing 52a and the center lines of the dowel pins 71a, 72a (FIG. 5). The other press assemblies 52b, 52c are characterized by similar planes of axial symmetry which each intersect the longitudinal center axis of test body 47 to each make a dihedral angle of 120° with the described symmetry plane for press assembly 51a. Each of the three hinge pins lie in a respective one of three planes which each contain both the mentioned longitudinal axis and a respective one of the three end-to-end edges of the equilateral triangular prismatic body 47. The center lines of the three hinge pins are all parallel to that last-named axis and are spaced equidistantly therefrom. The total area contacted on the rear face of each of the anvils by the pistons which drive it is an area substantially greater than that of the front face of the anvil. Thus, all of the anvils are adapted to act as pressure multipliers.

It has been found that, when the test body 47 has a length to width ratio of the order of 3 or more, the absence of active exertion of pressure upon the ends of the test body has a negligible effect upon the efficiency of compression of the specimen material 45. Accordingly, in the instance where the test body has a high length to width ratio, the ends of the described single delta apparatus may be closed off by ordinary end plates 80 which have no action other than to passively resist the pressure applied by the anvils to the test body and transmitted through the ends thereof to the mentioned plates. Each such end plate is traversed by three holes 81 permitting such plate to be slipped with a loose fit onto portions of the three hinge pins extending outwards of one end of the housings 52a—52c. When so slipped on, each plate 80 is drawn up by the tightening of nuts 82 threadedly received on these hinge pin extensions.

Where the test body 47 has a length to width ratio of less than 3 to 1, it is desirable to actively oppose at the ends of test body 47 the pressure transmitted thereto from the anvils 70a—70c. Such active opposition may be provided by substituting for the end plates 80 the end assemblies 90 shown in FIGS. 8 and 9. As is evident from those last named figures, each such end assembly 90 is a triangular block having holes 91 for loosely receiving the hinge pin extensions and having formed therein a hydraulic cylinder 91 connected through a port 93 to a fluid inlet at the outside of the block. The cylinder 92 contains the usual hydraulic piston 94 carrying an O type packing ring 95. During operation, the piston 94 undergoes little or no positive displacement, but, instead, is actuated by the hydraulic fluid injected into cylinder 92 to exert a forwardly directed force equal to or exceeding the rearwardly directed force exerted on the piston from the end contacted thereby of the test body 47 under pressure from the anvils 70a—70c.

Assuming that the end plates 80 are being used, and that, except for one such end plate, the apparatus is completely assembled with its hydraulic ram units being connected to receive hydraulic fluid, the further steps taken to operate the apparatus are as follows. One of the anvils is manually or hydraulically retracted from the others to facilitate insertion into the cavity between the anvils of a test body 47. Such test body is pushed through the one remaining open end of the apparatus into such cavity until the front end of the body bears against the assembled end plate. The remaining open end of the apparatus is then closed off by securing thereto the remaining end plate 80. Thereafter, the apparatus is operated by actuating its cylinder and piston units with pressurized hydraulic fluid to produce simultaneous inward movement of all anvils. When the anvils are so moved, the specimen material 45, within test body 47, is subjected to super high pressure in the manner previously explained in connection with the FIG. 1 apparatus. Upon completion of the compressing operation, the compressed specimen material is recovered by removing the hinge pin of the apparatus and by separating its press assemblies.

Figure 10:
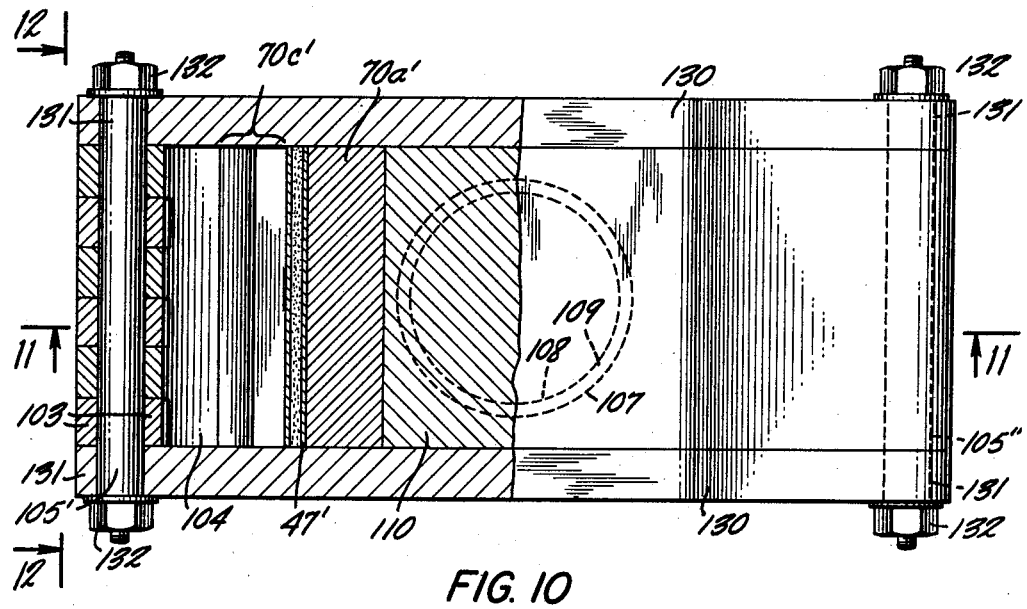
FIG. 10 is a plan view of a double "delta" form of multi-anvil apparatus, part of such apparatus being broken away as indicated by the arrows 10—10 in FIG. 11.
Figure 11:
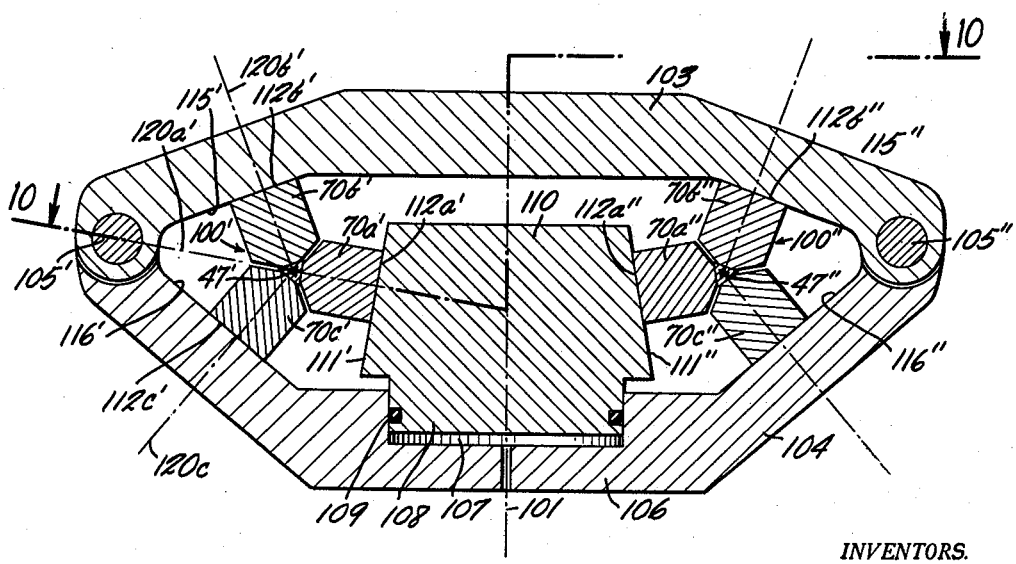
FIG. 11 is a vertical cross section taken as indicated by the arrows 11—11 in FIG. 10, of the FIG. 10 apparatus.
Figure 12:
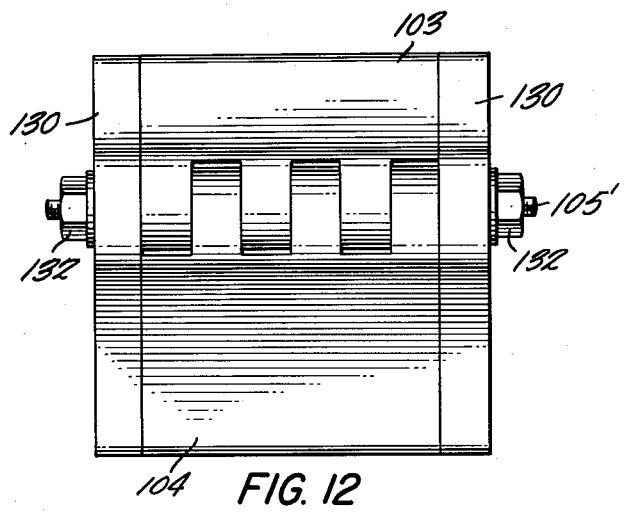
FIG. 12 is an end view taken as indicated by the arrows 12—12 in FIG. 10, of the FIG. 10 apparatus.

As an alternative to actuating the anvils by hydraulic ram units directly coupled thereto, the anvils may be driven by a wedging action produced in the manner exemplified by the operation of the double "delta" apparatus shown in FIGS. 10–12. Referring to those figures, a left hand test body 47' is disposed at the center of an array of anvils 70a'—70c' which, with the test body, form a multi-anvil configuration 100'. This left hand configuration is matched by a right hand multi-anvil configuration 100'' formed of a test body 47'' and a surrounding array of anvils 70a''—70c''. Except as later noted, each of the configurations 100' and 100'' is a duplicate of the multi-anvil configuration formed in the already described single delta apparatus by the test body 47 and the anvils 70a—70c. Hence, there is no need for describing the configurations 100', 100'' in great detail. As shown in FIG. 11 those two configurations are symmetrically disposed in relation to the vertical plane 101 bisecting the double delta apparatus.

The mentioned configurations 100', 100'' are surrounded by an open ended frame which is of generally trapezoidal cross-section, and which is comprised of an upper web 103 and a lower web 104. The webs 103 and 104 are joined together at the opposite ends of both by left hand and right hand hinged joints having hinge pins 105', 105'' and otherwise being similar to the already described hinged joints of the single delta apparatus. The lower web 104 is centrally thickened to provide a block 106 containing a hydraulic cylinder 107 which either may be directly formed in block 106 to be integral therewith (as shown), or, alternatively, may be a standard hydraulic cylinder assembly inserted into a suitable receptacle formed in the block. The cylinder 107 has received therein a hydraulic piston 108 with an O type packing ring 109. The cylinder and piston unit formed of 107—109 may further include additional components conventional in ordinary hydraulic ram units as, say, guides, bushing and other fittings.

The upper planar face of piston 108, carries a rectangular wedging bar 110 having a length co-extensive with the multi-anvil configurations 100', 100'', and having planar side faces 111', 111'' which slope inwardly from bottom to top to render the bar of trapezoidal cross-section. As shown, the side faces 111', 111'' provide slide surfaces for the rear planar faces 112a', 112a'' of, respectively, the left hand and right hand anvils 70a' and 70a''.

As illustrated by FIG. 11, the double delta apparatus is symmetrical about its vertical center plane 101. Accordingly, only the left hand half of the apparatus will be described in further detail. In this connection, it is to be understood that, unless the context otherwise requires, a description of an element of the left hand half is to be taken also as a description of a right hand element indicated as being the counterpart of the left hand element by being designated by a reference symbol which has a double prime rather than a prime suffix, but which is otherwise the same as that employed to designate the left hand element.

As stated, the left hand side face 111' of wedging bar 110 provides a slide surface which backs anvil 70a' of the multi-anvil configuration 100'. The second anvil 70b' of this configuration is likewise backed by a planar slide surface 115' formed on the underside of web 103. Similarly, the third anvil 70c' is backed by a planar slide surface 116' formed on the upper side of web 104. The rear faces 112a'—112c' of the anvils 70a'—70c' are all planar faces adapted to be in force communication over their entire areas with the slide surfaces which back them.

The following geometric relations obtain between the anvils 70a'—70c', the rear faces thereof and the surfaces on which those rear faces slide. The slide surface 111' of wedging bar 110 and the matching planar rear face 112a' of anvil 78' are both normal to a plane 120a' which bisects the anvil 70a', and which passes through the principal axis of the test body 47' and of the hinge pin 105'. This plane 120a' makes a dihedral angle of 120° with each of the planes 120b' and 120c' which bisect, respectively, the anvils 70b' and 70c', and which likewise pass through the principal axis of the test body 47'. The planes of the slide surfaces 115', 116' on, respectively, the webs 103, 104 are not, however, exactly normal to, respectively, the planes 120b' and 120c'. Instead, the surfaces 115', 116' are each tilted by about 1 degree from the positions they would have if normal to the last named planes. The direction of the tilt is such that the planes of surfaces 115', 116' intersect to form a dihedral angle with an edge parallel to the principal axis of the test body 47, and with an angular value of about 58° as opposed to 60°. Inasmuch as the rear faces 112b' and 112c' of the anvils 70b', 70c' are parallel to, respectively, the slide surfaces 115', 116', the mentioned rear faces are likewise each tilted at an angle of about 1 degree to the bisecting plane of the anvil to which the rear face belongs. As explained in detail in our copending application Serial No. 833,809, filed August 13, 1959, for "Pressure Apparatus," such slight angular tilting of those anvil rear faces and of the corresponding slide surfaces is a feature by which a driving force applied normally to the rear face of anvil 70a' is resolved into components which respectively act upon the anvils 70b', 70c', and which cause those last named anvils to be displaced over the slide surfaces 115', 116' towards the hinge pin 105'.

To improve the sliding of the anvils 70a'—70c' over the surfaces by which such anvils are respectively backed, a lubricant of some sort may be introduced between the rear face of each such anvil and the slide surface which corresponds thereto. While the character of the lubricant is not critical, we have found that a highly satisfactory lubricating effect is provided by inserting a thin sheet of polytetrafluoroethylene (i.e. "Teflon") between each anvil and its slide surface.

Figure 14:
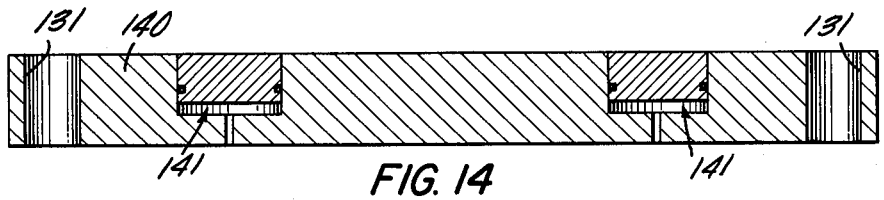
FIG. 14 is a cross section taken as indicated by the arrows 14—14 of the end closure shown in FIG. 13.
Figure 13:
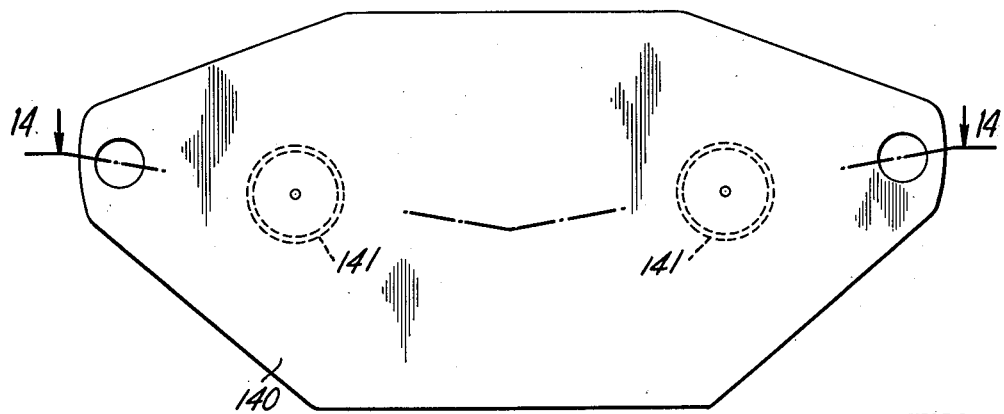
FIG. 13 is a front elevation of a modified end closure for the FIG. 10 apparatus.

Prior to a compressing operation, the frame formed by webs 103, 104, is closed at its previously open ends by a pair of end plates 130 traversed by holes 131 permitting each plate to be slipped with a loose fit onto portions of the hinge pins 105, 105' extending outwards of one end of the frame. Thereafter, the plates 130 are drawn against the frame by the tightening of nuts 132 threadedly received on such hinge pin extensions. The simple end plates 130 may be replaced by blocks 140 (FIGS. 13 and 14) of which each has a pair of cylinder and piston units 141 which, when the block is secured, are disposed opposite the ends adjacent that block of, respectively, the test bodies 47' and 47''. The structure and operation of such cylinder and piston unit is the same as that of the already described cylinder and piston units in the end blocks 90 (FIG. 9) of the single delta apparatus.

The operation of the double delta apparatus is as follows. First, the test bodies 47' and 47'' are inserted into the multi-anvil configurations 100', 100''. The apparatus is then rendered ready for operation by the same steps as those previously described for the single delta apparatus. Next, hydraulic fluid under pressure is injected into cylinder 107 to drive upwardly the piston 108 and the wedging bar 110. As the bar 110 moves upwardly, the anvil 70a' slides over the side face 111' of the bar to be wedged by such face so as to be driven forward against the test body 47'. The force applied to that test body from anvil 70a' is, as described, resolved into two components which are transmitted to the anvils 70b', 70c', and which produce sliding of those last named anvils over, respectively, the surfaces 115' and 116'. Because of the inclination of those surfaces to each other, the slidings thereover of the anvils 70b', 70c' produce wedging displacements of such anvils toward the test body 47', and, by appropriate design of the apparatus, such wedging displacements towards the center of body 47' are made equal to the concurrent displacement of anvil 70a' toward that center. Accordingly, the test body 47' is simultaneously compressed by equal movements of all three of the anvils 70a'–70c'.

While the left-hand test body 47' is so being compressed, the right-hand test body 47'' is likewise being compressed by its anvils 70a''—70c''. Because the double delta apparatus is symmetrical about its vertical center plane 101, the active and reactive forces involved in the compression of body 47' are equal and opposite to the active and reactive forces involved in the compression of body 47''. The result is that the two sets of forces tend to cancel each other out to thereby reduce the stress in the apparatus to a minimum. While the double delta apparatus requires a greater piston stroke than the single delta apparatus in order to produce a given anvil displacement, at the same time, the double delta apparatus requires less hydraulic pressure than the single delta device in order to produce a given value of anvil driving force. Thus, in effect, the double delta apparatus does a given amount of "work" by a greater piston displacement but with a lesser hydraulic pressure than the single delta apparatus.

In both the single and double delta presses, the employed triangular configuration of anvils is advantageous in that the number of anvils is reduced to a minimum (to, say, permit easier alignment thereof), and in that the 120° angle between the sloping front end faces of each anvil is the greatest anvil convergence angle possible for an array of identical anvils surrounding a test body. By so maximizing the convergence angle of each anvil there is obtained a maximization of the pressure which the anvil can exert upon the test body while avoiding structural failure of the anvil.

As in the case of the triangular anvil configuration, the triangular configuration of the housings 52a–52c of the single delta apparatus has the advantage that a minimum number of housings and associated components are required. Furthermore, inasmuch as a triangular frame is inherently a rigid body, the frame formed by the housings 52a–52c maintains itself in proper alignment at all times, i.e. at a time preliminary to a compressing operation as well as during the operation itself.

Figure 15:
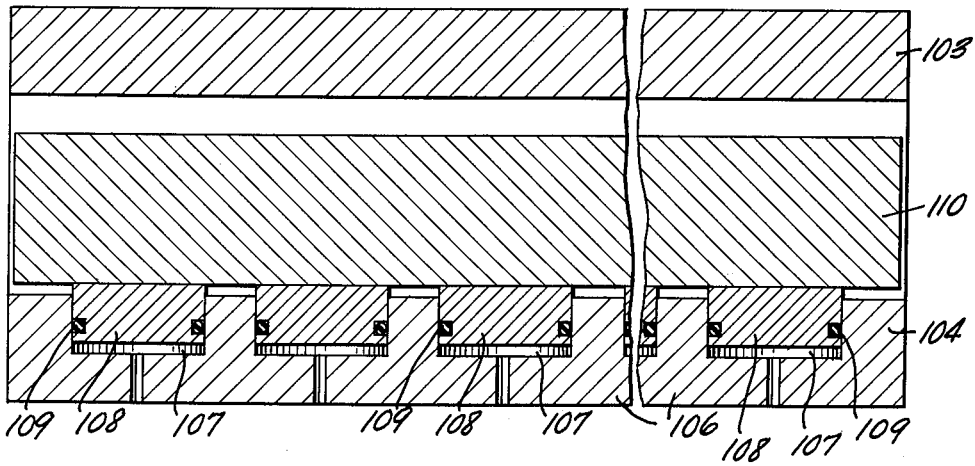
FIG. 15 is a view in cross section through the vertical center plane (FIG. 11) of the double delta apparatus as modified to use a plurality of hydraulic cylinder and piston units for the purpose of driving the anvils thereof.

The above described embodiments being exemplary only, it will be understood that the invention hereof comprehends embodiments differing in form and/or detail from those specifically described. For example, the anvils of the FIG. 1 apparatus may be modified to compress prismatic test bodies, and, also, the anvils of the single and double delta presses may be modified to compress cylindric test bodies. Further, it is evident that the anvils of the single delta press may each be driven by a single cylinder and piston unit such as is used in the double delta press. Conversely, as shown by FIG. 15, the wedging bar of the double delta press may be driven by a plurality of cylinder and piston units such as are used to drive each anvil in the single delta press. Further, both in the case of the single and double delta presses, a plurality of the press units described herein may be aligned end to end (absent end plates at the one or more interfaces of adjacent units), and the aligned units may then be secured together (through hinge pins running the length of all units) to result in a multi-unit press which (with its two ends closed) is adapted to compress a test body of greater length than can be accommodated by any one such unit. Still further, while the FIG. 1 press and the single and double delta presses have been described with particular reference to their use in compressing test bodies having a length to width ratio of greater than 1, it is evident that such presses are also of application for compressing test bodies wherein the length to width ratio has a value of one or less.

Accordingly, the invention is not to be considered as limited save as is constant with the scope of the following claims.

We claim:

1. Super high pressure apparatus comprising, a plurality of pressure multiplying anvils having respective front faces disposed around the principal axis of a central cavity to define therefor a cylindric-prismatic circumferential surface, said anvil front faces being axially elongated to render said cavity axially longer than the width thereof, and said anvils being rendered movable relative to and towards each other by gaps separating each anvil from ones adjacent thereto, means to produce between all of said anvils a relative movement towards each other so as to subject to high pressure a test body then contained in said cavity, a pair of end closure means for said cavity at opposite ends of said cavity and comprised of respective stationary members in pressure coupled relation with said cavity to be subjected to opposite axial forces therefrom when said test body is so subjected to high pressure, and force coupling means connected at each of opposite ends thereof to a respective one of said members to provide therebetween a tie coupling through which said opposite forces are balanced against each other.

2. Apparatus as in claim 1 in which said pair of end closure means comprise a pair of end plates adapted to passively resist the pressure produced in said test body by said anvils.

3. Apparatus as in claim 1 in which said pair of end closure means are each adapted to have pressure transmitted thereto to actively oppose the pressure generated in said test body by said anvils.

4. Super high pressure apparatus comprising, three pressure multiplying anvils having respective front faces disposed around the principal axis of an axially elongated prismatic cavity of equilateral triangular cross section normal to said axis to define by said front faces the circumferential prismatic surface of said cavity, the front face of each anvil being bisected by a respective one of three anvil center planes each containing said axis to form three 120° dihedral angles therearound, each of said anvils being convergently tapered towards the front face thereof by two planar side faces on opposite sides of the anvil center plane and defining respective planes which intersect to form a 120° dihedral angle bisected by such center plane, and all said anvils being rendered movable relative to and towards each other by gaps disposed between the side faces of said anvils to separate each anvil from the others, and means disposed about said anvils to subject each anvil to an inwardly directed force of which the center line of effective action lies in said center plane for such anvil, said means being further adapted to produce between all of said anvils a relative movement towards each other so as to subject to high pressure a test body then contained in said cavity.

5. Apparatus as in claim 4 in which said means comprises, drive means in the form of a plurality of hydraulic rams disposed behind and coupled to said anvils to move each of them inwardly, and a frame circumferentially closed about both said anvils and said drive means to provide a force absorbing backing for said drive means, said frame being comprised of three hinged members connected by hinge joints to form a configuration of equilateral triangular cross section, and the hinge lines of said hinge joints being parallel with said axis.

6. Super high pressure apparatus comprising, a plurality of pressure multiplying anvils having respective front faces symmetrically disposed around the principal axis of a central cavity to define therefor a cylindric-prismatic circumferential surface, the said anvil front faces being axially elongated to render said cavity axially longer than the width thereof, each of said anvils being convergently tapered towards the front face thereof by planar side faces disposed on opposite sides of and at equal inclinations to said front face, and said anvils being rendered movable relative to and towards each other by gaps disposed between the side faces of said anvils to separate each anvil from the ones adjacent thereto, means disposed about said anvils to subject each anvil thereof to an inward pressure of which the region of application is axially elongated, said means being adapted to produce between all of said anvils a relative movement towards each other so as to subject to high pressure a test body then contained in said cavity, said means comprising drive means in the form of at least one hydraulically actuated means coupled to one of said anvils to move it inwardly, and a plurality of hinged members connected together by hinge joints of which the hinge lines are parallel to said axis to provide a frame circumferentially closed about said anvils and drive means, said frame being disposed behind ones of said anvils to receive outwardly directed load pressure developed from the pressure contact between such anvils and the test body and exerted on said frame over axially elongated regions of said frame at least coextensive with said regions of inward pressure application.

7. Apparatus as in claim 6 in which said drive means comprises at least one set of hydraulic cylinder and piston units spaced in a row parallel to said axis.

8. Apparatus as in claim 4 in which said means comprises at least one hydraulic cylinder and piston unit respective to each anvil and adapted by movement of the piston in line with the center line of action of the associated anvil to urge it towards the center of said cavity.

9. Apparatus as in claim 4 in which said means comprises means adapted by a wedging action to move one of said anvils towards the center of said cavity, and to thereby displace the other two anvils in the direction of movement of said one anvil, and means providing a pair of slide surfaces backing said other two anvils and adapted to translate said displacements thereof into wedgings of said other two anvils towards the center of said cavity.

10. Apparatus as in claim 7 in which drive means includes one such set of cylinder and piston units, each such set of cylinder and piston units being disposed to the rear of its associated anvil to drive such anvil forwardly towards the center of said cavity.

11. Apparatus as in claim 7 in which said set of cylinder and piston units is adapted by a wedging action provided by a member driven thereby to move one of said anvils towards the center of said cavity and to thereby displace others of said anvils in the direction of movement of said one anvil, said apparatus further comprising a plurality of slide surfaces of which each is provided by a respective one of said hinged members and backs a respective one of said other anvils, said slide surfaces being adapted to translate said displacements of said other anvils into wedgings thereof towards the center of said cavity.

12. Apparatus for compressing, first and second similar test bodies each comprised of a central specimen to be compressed and a surrounding jacket of pressure transmitting material extrudable under pressure applied thereto from anvils into gaps between said anvils to form a pressure seal in said gaps, a first plurality of anvils having front faces and surrounding a first cavity for receiving said first test body to form around said first cavity a first anvil configuration in which said first cavity is bordered by said first faces of the anvils belonging to said first plurality, a second plurality of anvils having front faces surrounding a second cavity to form around said second cavity a second anvil configuration in which said second cavity is bordered by said front faces of the anvils belonging to said second plurality, means common to said two configurations for producing in each a movement of said anvils thereof relative to and towards the center of the cavity respective to that configuration to render the corresponding test body when in such cavity compressed by the anvils of that configuration, and housing means common to both configurations and closed about both to receive equal and opposite loads therefrom upon the simultaneous actuation of the anvils of both configurations.

13. Apparatus as in claim 12 in which each cavity has two ends between which is disposed a peripheral surface defined by the front faces of the anvils associated with that cavity and geometrically generatable by self-parallel movement of a straight generatrix line about a closed path, the generatrix lines for the peripheral surfaces of the cavities being parallel, and in which the anvils associated with each cavity are disposed to surround the peripheral surface thereof with the longitudinal axes of said anvils being parallel to the generatrix line of such peripheral surface, and with each of such anvils registering with a respective lengthwise portion of such peripheral surface.

14. Apparatus as in claim 11 in which each cavity is a prismatic shaped cavity having a triangular cross section.

15. Apparatus for compressing first and second similar test bodies comprised of a central specimen to be compressed and a surrounding jacket of pressure transmitting material extrudable under pressure applied thereto from anvils into gaps between said anvils to form a pressure seal in said gaps, said apparatus comprising a first plurality of anvils surrounding a first cavity for receiving said first test body to form around said first cavity a first anvil configuration, a second similar plurality of anvils surrounding a second cavity for receiving said second test body to form around said second cavity a second anvil configuration similar to the first and symmetrically disposed in relation thereto, drive means common to said two configurations for moving at least a first of the anvils of each relative to and towards the center of the cavity associated with that configuration, and to thereby displace at least a second and a third anvil of such configuration in the direction of movement of the first anvil thereof, and means providing slide surfaces respectively backing the second and third anvils of each configuration and adapted for each configuration to translate the said displacements of the second and third anvils thereof into wedgings of said second and third anvils towards the center of the cavity associated with that configuration.

16. Apparatus as in claim 15 in which the first anvils respective to the two configurations are in back to back relation, and in which said drive means comprises a wedge member disposed between the two first anvils and having oppositely disposed wedging surfaces of which each backs a respective one of said two first anvils, said drive means further comprising means to displace said wedge member relative to said two first anvils to produce a simultaneous wedging of each towards the center of the associated test body.

References Cited in the file of this patent

UNITED STATES PATENTS

| 698,115 | Hird | Apr. 2, 1902 |
|---|---|---|
| 1,167,009 | Nall | Jan. 4, 1916 |
| 1,305,975 | Pfanstiehl | June 3, 1919 |
| 1,386,003 | Kempton | Aug. 2, 1921 |
| 1,708,178 | Hottel | Apr. 9, 1929 |
| 1,748,176 | Hottel | Feb. 25, 1930 |
| 2,918,699 | Hall | Dec. 29, 1959 |
| 2,941,246 | Bundy | June 21, 1960 |
| 2,941,248 | Hall | June 21, 1960 |
| 2,947,034 | Wentorf | Aug. 2, 1960 |

FOREIGN PATENTS

| 496,508 | France | Nov. 8, 1919 |
|---|---|---|
| 509,186 | France | Nov. 3, 1920 |
| 1,035,352 | Germany | July 31, 1958 |

UNITED STATES PATENT OFFICE
CERTIFICATE OF CORRECTION

Patent No. 3,080,609                  March 12, 1963

George Gerard et al.

It is hereby certified that error appears in the above numbered patent requiring correction and that the said Letters Patent should read as corrected below.

Column 3, line 72, for "30,000" read -- 300,000 --; column 4, line 6, for "match" read -- much --.

Signed and sealed this 1st day of October 1963.

(SEAL)
Attest:

ERNEST W. SWIDER                          DAVID L. LADD

Attesting Officer                            Commissioner of Patents